UNITED STATES PATENT OFFICE.

CHRISTIAN RUDOLPH, OF HÖCHST-ON-THE-MAIN, GERMANY, ASSIGNOR TO FARBWERKE, VORMALS MEISTER, LUCIUS & BRÜNING, OF SAME PLACE.

MANUFACTURE OF METAMETHYL INDIGO.

SPECIFICATION forming part of Letters Patent No. 276,890, dated May 1, 1883.

Application filed October 24, 1882. (Specimens.)

*To all whom it may concern:*

Be it known that I, CHRISTIAN RUDOLPH, a citizen of the Empire of Germany, residing at Höchst-on-the-Main, in the Empire of Germany, have invented certain new and useful Improvements in the Manufacture of Metamethyl Indigo, of which the following is a specification.

The metamethylaldehyde, (toluylaldehyde,) which can be produced after well-known methods from metaxylol, on being nitrated, behaves like the metabromobenzoic acid—*i. e.*, it allows the hydrogen atom standing in ortho position with the respect to the CHO group to be replaced by the nitro group.

To produce the orthonitrometamethylbenzaldehyde I proceed as follows: I dissolve, while cooling, twelve parts of toluylaldehyde in six times the quantity, by weight, of concentrated sulphuric acid. Into this solution, at a temperature which does not exceed 59° Fahrenheit, (15° centigrade,) slowly flow a cold mixture of ten parts of nitric acid (1.4 specific gravity) and of twenty parts of concentrated sulphuric acid. When the mass resulting from the reaction is poured into ice-water the nitroaldehyde produced separates in form of an oil, which is now consecutively washed with water and a dilute carbonate-of-soda solution. For the production of methyl indigo it may either be used directly or previously purified by distilling in a current of steam.

To produce the methyl indigo I proceed as follows: I dissolve one part of orthonitrometamethylbenzaldehyde in the double quantity of acetone or ethylaldehyde, and to this solution I add twenty-five parts of a sodium lye of two per cent. The indigo, which is formed promptly, is collected on a filter and purified by consecutively washing it with water and alcohol. In its physical properties the methyl indigo resembles very closely the natural indigo. It is of dark-blue color, and, rubbed, shows copper luster. As contrasted with the natural indigo, the methyl indigo is easily soluble in alcohol. Heated with nitric acid, it is destroyed, turning yellow.

What I claim as new, and wish to secure by Letters Patent, is—

As a new article of manufacture, metamethyl indigo having the peculiarities substantially as herein set forth.

In testimony whereof I have affixed my signature in presence of two witnesses.

CHRISTIAN RUDOLPH.

Witnesses:
A. S. HOGUE,
J. GRUND.